(12) United States Patent
Leachman et al.

(10) Patent No.: US 10,173,785 B2
(45) Date of Patent: Jan. 8, 2019

(54) COMBINED MODE CONTROLLER AND DISPLAY CONTROL UNIT

(71) Applicant: Bell Helicopter Textron Inc., Fort Worth, TX (US)

(72) Inventors: Joe Leachman, Keller, TX (US); Thomas B. Priest, Orange, CT (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/617,804

(22) Filed: Jun. 8, 2017

(65) Prior Publication Data

US 2018/0354645 A1 Dec. 13, 2018

(51) Int. Cl.
*B64D 43/00* (2006.01)
*G01C 23/00* (2006.01)
(52) U.S. Cl.
CPC ............. *B64D 43/00* (2013.01); *G01C 23/00* (2013.01)
(58) Field of Classification Search
CPC ................................ B64D 43/00; G01C 23/00
See application file for complete search history.

(56) References Cited

U.S. PATENT DOCUMENTS

2013/0013133 A1* 1/2013 Walter ................ G08G 5/0021
701/11

OTHER PUBLICATIONS

Perry, Dominic, "Analysis: Bell 525 Relentless cutaway and technical description", Flight International, London, Nov. 12, 2014, 8 pages; https://www.flightglobal.com/news/articles/analysis-bell-525-relentless-cutaway-and-technical-40551.
"Bell 525 Relentless" poster, Bell Helicopter: A Textron Company, Flight International; Nov. 12, 2014.

* cited by examiner

*Primary Examiner* — Brian A Zimmerman
*Assistant Examiner* — Sara B Samson
(74) *Attorney, Agent, or Firm* — Lightfoot & Alford PLLC

(57) ABSTRACT

A combined controller with a panel that has a face and a back, a case attached to the back of the panel. The face of the panel includes a plurality of first primary flight display inputs configured to receive physical inputs for the control of a first primary flight display; a plurality of second primary flight display inputs configured to receive physical inputs for the control of a second primary flight display; and a plurality of flight control inputs configured to receive physical inputs for the control of automated flight behavior.

20 Claims, 10 Drawing Sheets

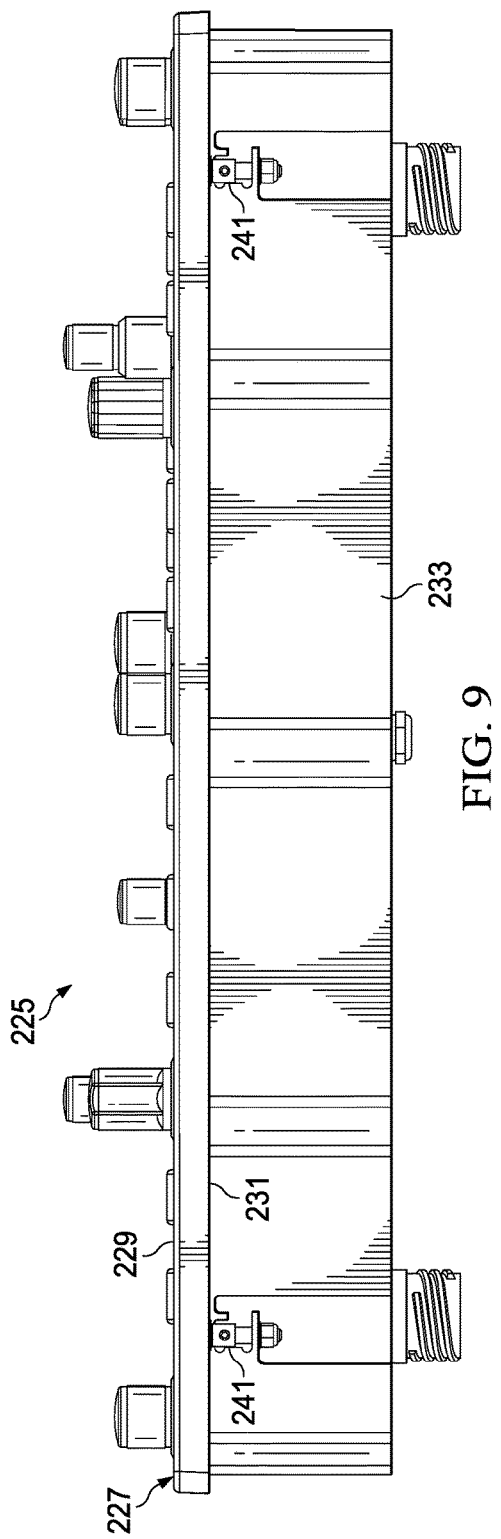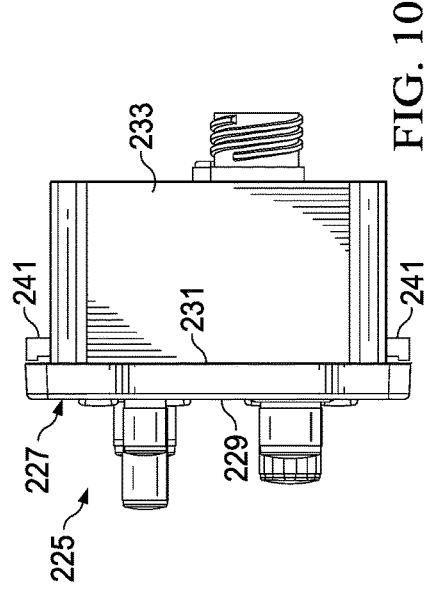

COMBINED MODE CONTROLLER AND DISPLAY CONTROL UNIT

BACKGROUND

Aircraft cockpits commonly include one or more primary flight displays ("PFD") and one or more multi-function displays ("MFD"). The PFD may be configured to display situational flight information. This information may include, for example, speed, attitude, vertical rate, altitude, flight progress, GPS location, plotted versus actual course, etc. The MFD may be configured to display navigation route, map, weather radar, ground proximity warning system information, traffic collision avoidance information, and more. In multi-pilot aircraft, it is common for each pilot to have their own PFD and MFD. It is important that each pilot has the ability to control their own displays. As such, the PFD and MFD controls may generally be incorporated directly into the frame surrounding the PFD or MFD, respectively, or they may be located in a separate control unit placed elsewhere in the cockpit within reach of the corresponding pilot. However, depending on workflow within the crew, it may occasionally be desirable for one pilot to adjust the other pilot's displays. As such, it may be desirable for the controls for all of the displays to be within reach of both pilots. The only location in a cockpit that is easily accessible to both pilots is the center stack. Given that all of the flight controls must be within reach of both pilots, space on the center stack is limited.

Aircraft may also include a mode control panel ("MCP"). The MCP includes controls to input automated flight behavior. For example, the MCP may be used to enter instructions for the aircraft to hold a specific altitude, speed, or heading, to change altitude or speed at a specific rate; or to input a new heading, etc. Accordingly, the flight controls included on the MCP should be within reach of both pilots, and therefore, the MCP should be located on the center stack.

BRIEF DESCRIPTION OF THE DRAWINGS

FIG. 9 is a bottom view of the combined controller of FIGS. 6-8.

FIG. 10 is a right-side view of the combined controller of FIGS. 6-9.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In furtherance of the goals of efficient controller design and weight savings, this disclosure provides a single controller unit that combines the input controls of an MCP with the input controls of at least one PFD. The disclosed combined controller unit may be used on any aircraft, including fixed wing aircraft as well as rotorcraft. The combined controller not only saves space but saves weight and enables the cockpit to include PFD controls on the crowded center stack. Moreover, the combination of control units allows for the elimination of some inputs, as some of the inputs on the combined unit may perform multiple functions. In addition, the combined unit enables some of the inputs to act as back-up inputs for other functions in the event the main inputs fail. For example, the PFD controls may serve as backup controls for the MFD.

Figure 1:
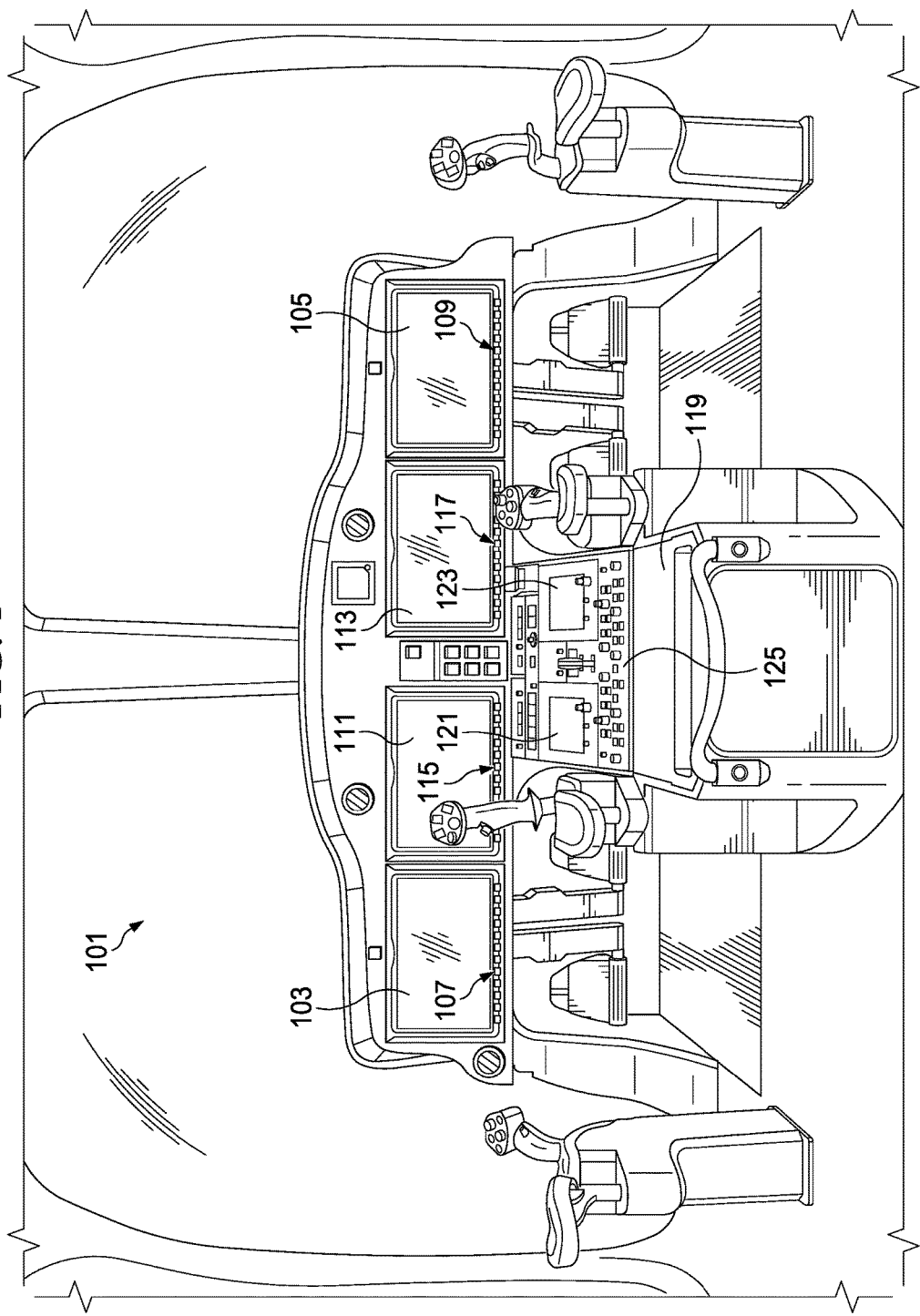
FIG. 1 is an illustration of a cockpit including a combined controller according to this disclosure.
Figure 2:
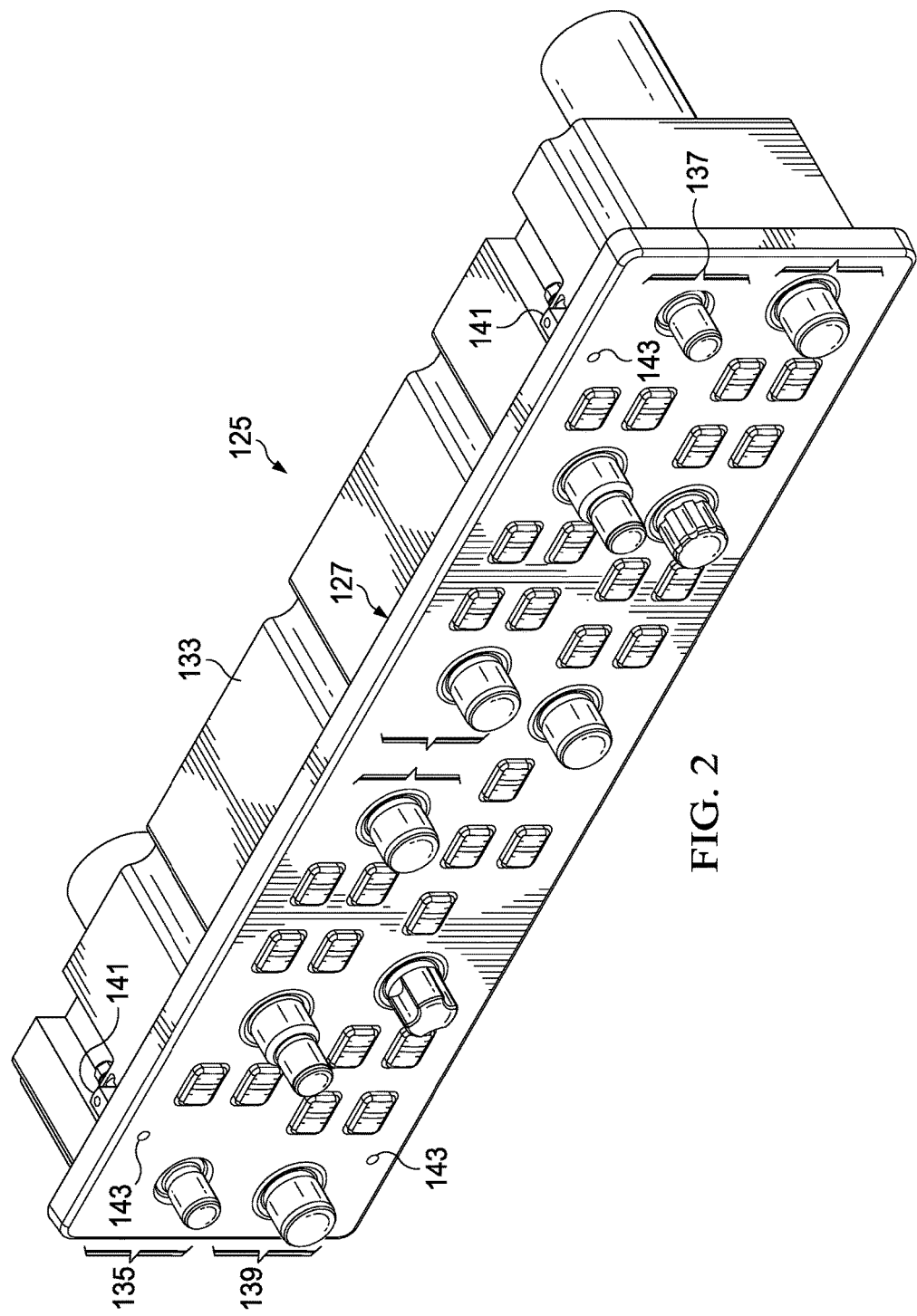
FIG. 2 is an oblique view of the combined controller of FIG. 1.
Figure 3:
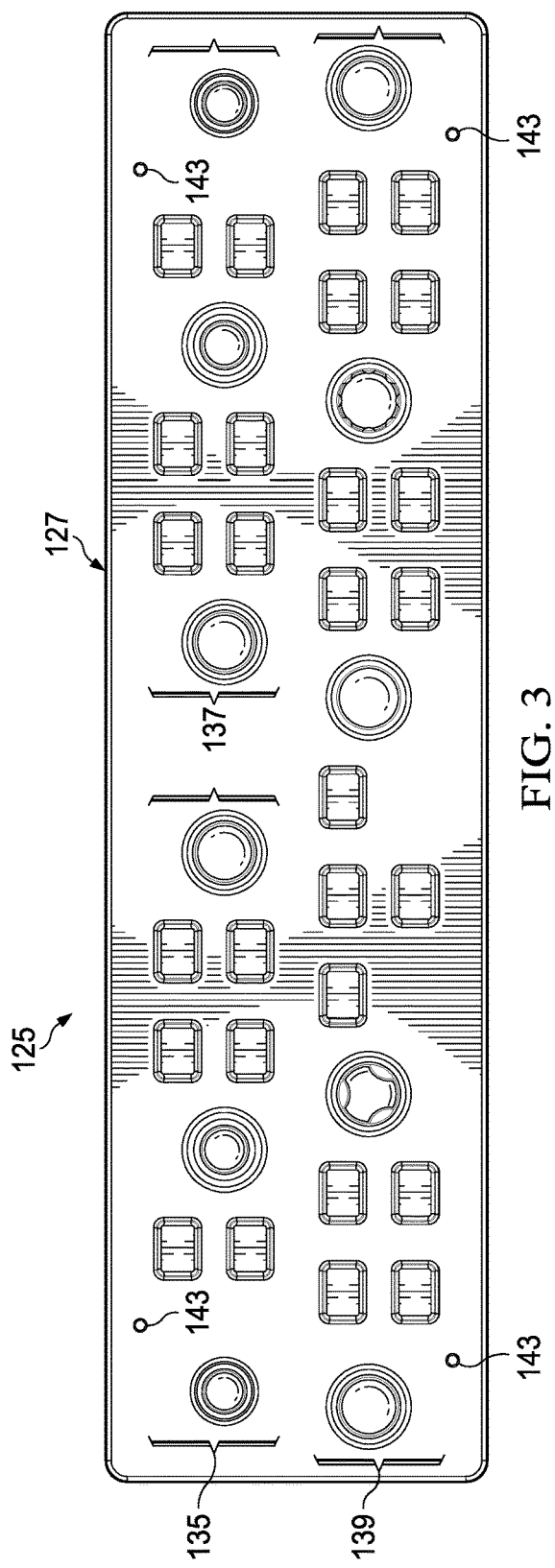
FIG. 3 is a front view of the combined controller of FIGS. 1 and 2.
Figure 4:
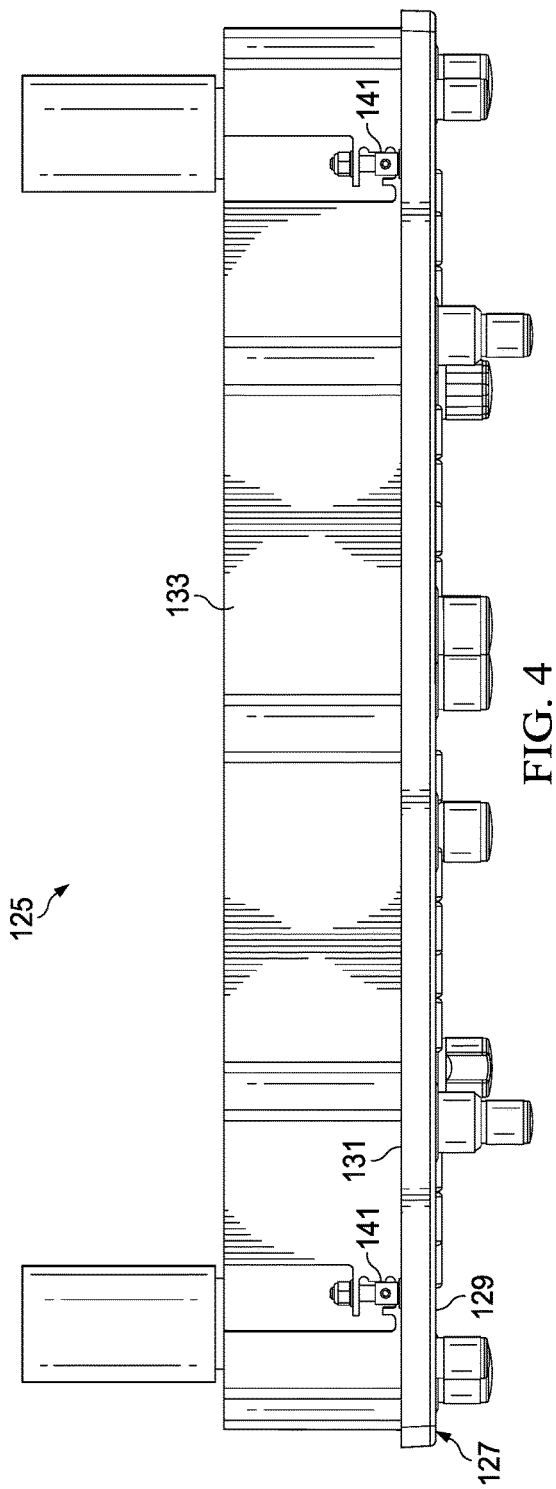
FIG. 4 is a top view of the combined controller of FIGS. 1-3.
Figure 5:
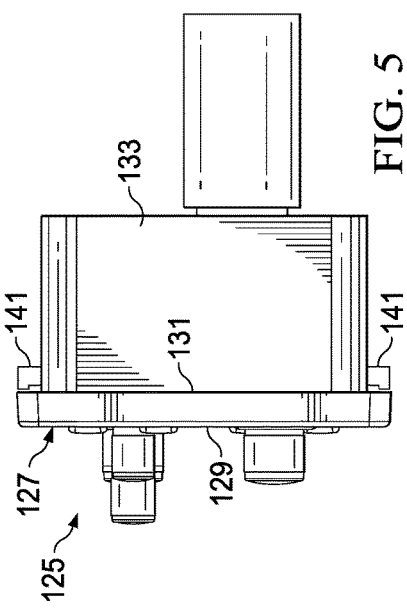
FIG. 5 is a right-side view of the combined controller of FIGS. 1-4.

Referring to FIG. 1, a cockpit 101 of a rotorcraft is illustrated. Cockpit 101 includes a first primary flight display 103 and a second primary flight display 105 for the display of flight information to a first pilot and a second pilot, respectively. The flight information may include, but is not limited to, airspeed, altitude, attitude, heading, course deviation indicator, and map. The screens of first primary flight display 103 and second primary flight display 105 may be LCD, LED, or any other suitable type of display screen. The first primary flight display 103 may include a plurality of inputs 107 located on the frame thereof. Similarly, second primary flight display 105 may include a plurality of inputs 109 located on the frame thereof. These inputs 107, 109 may be soft keys or hard keys for the control of first and second primary flight displays 103, 105, respectively. In between first primary flight display 103 and second primary flight display 105 are first multi-function display 111 and second multi-function display 113. First and second multi-function displays 111, 113 may display navigation route, map, weather radar, ground proximity warning system information, traffic collision avoidance information, and more to the first and second pilot, respectively. First multi-function display 111 may include a plurality of inputs 115 in the frame thereof. Similarly, second multi-function display 113 may include a plurality of inputs 117 in the frame thereof. These inputs 115, 117 may be soft keys or hard keys for the control of first and second multi-function displays 111, 113. Located on a center stack 119, between the pilots, is a first multi-function control unit 121. Adjacent to first multi-function control unit 121 is a second multi-function control unit 123. In the embodiment shown in FIG. 1, both first and second multi-function control units 121, 123 are customizable touch screens configured for the control of first and second multi-function displays 111, 113, respectively. However, first and second multi-function control units 121, 123 may utilize buttons, bezels, dials, joysticks, or any other type of physical inputs, rather than, or in addition to, touch screens. Below first and second multi-function control units 121, 123 is a combined controller 125. Combined controller 125 is used to control first primary flight display 103, second primary flight display 105, and to control automated flight behavior. Automated flight behavior may include, but is not limited to, holding a specific altitude, speed, or heading, and changing altitude or speed at a specific rate.

As shown in FIGS. 2-5, combined controller 125 includes a panel 127 having a face 129 and an opposite back 131. Back 131 is configured to attach to a case 133. Case 133 is configured to house and protect the electronic components (not shown) of combined controller 125. On face 129 of panel 127 there are a plurality of first primary flight display inputs 135. Plurality of first primary flight display inputs 135 are configured to receive physical inputs from a pilot for the control of first primary flight display 103. Also on face 129 of panel 127 there are a plurality of second primary flight display inputs 137. Plurality of second primary flight display inputs 137 are configured to receive physical inputs from a pilot for the control of second primary flight display 105. Also on face 129 of panel 127 there are a plurality of flight control inputs 139. Plurality of flight control inputs 139 are configured to receive physical inputs from the pilots for the control of automated flight behavior. Any of inputs 135, 137, 139 may be soft keys or hard keys. In addition, while the inputs 135, 137, 139 shown in FIGS. 1-5 are disclosed as physical buttons and dials, it is within the scope of this disclosure to replace some or all of the inputs with touch screen inputs.

As part of the motivation behind combined controller 125 is to save weight, combined controller 125 should be constructed from lightweight materials, such as, aluminum, fiber composites, and high-performance plastics. In addition, combined controller 125 should be made as small as possible while still maintaining ease of use without increasing the risk of accidentally activating inputs adjacent to the intended input. As such, combined controller 125 has a preferred maximum width of 14.25 inches and a preferred maximum height of 3.70 inches. It is also preferred that combined controller 125 be configured as a line replaceable unit, and therefore, combined controller 125 should be entirely self-contained and be easily installed and removed from center stack 119. To aid in the quick installation/removal, combined controller 125 includes four pawl latches 141 configured to engage center stack 119. Pawl latches 141 are engaged with a tool, e.g., a hex wrench or a screw driver, via openings 143 in face 129.

Figure 6:
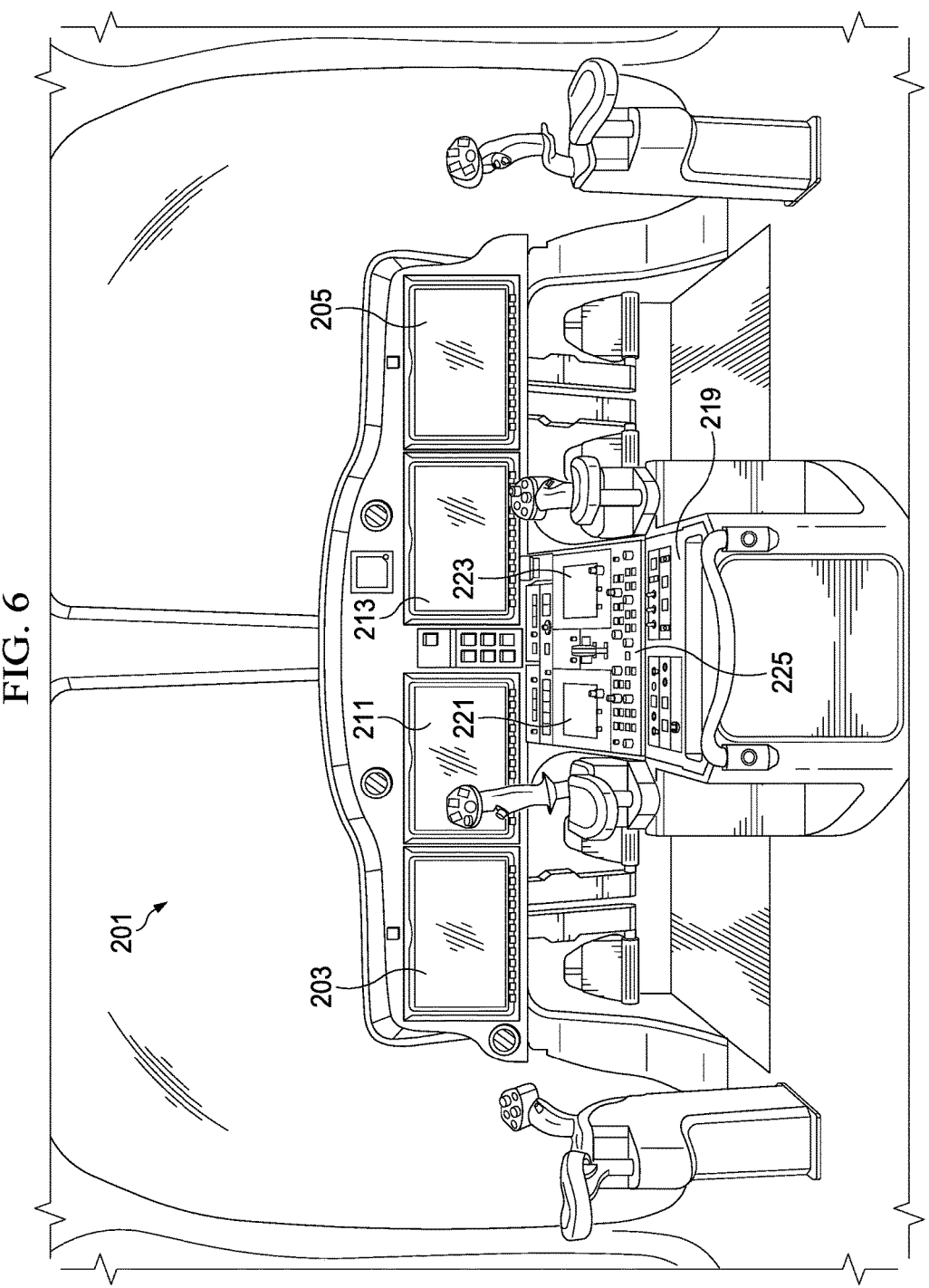
FIG. 6 is an illustration of a cockpit including another embodiment of a combined controller according to this disclosure.
Figure 7:
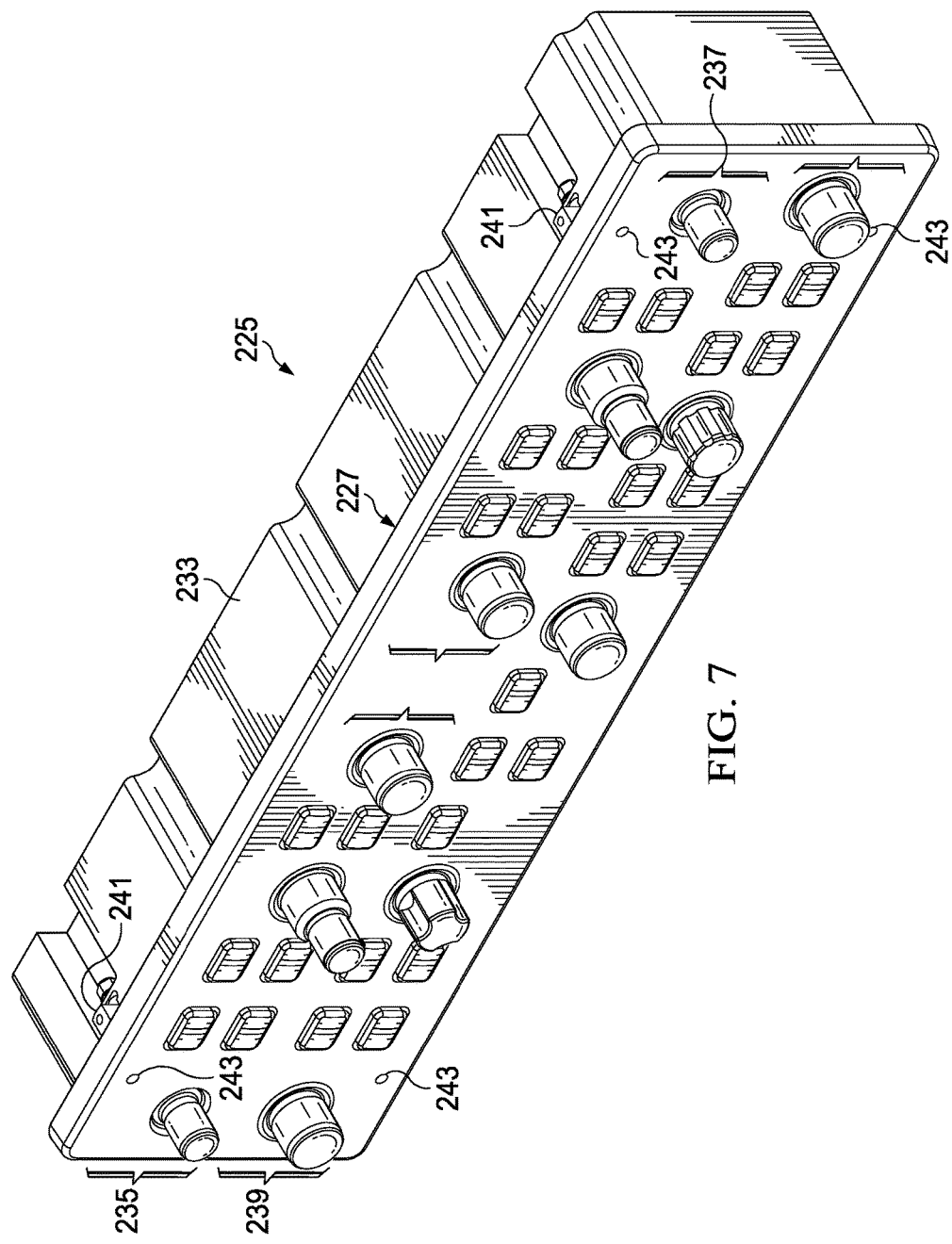
FIG. 7 is an oblique view of the combined controller of FIG. 6.
Figure 8:
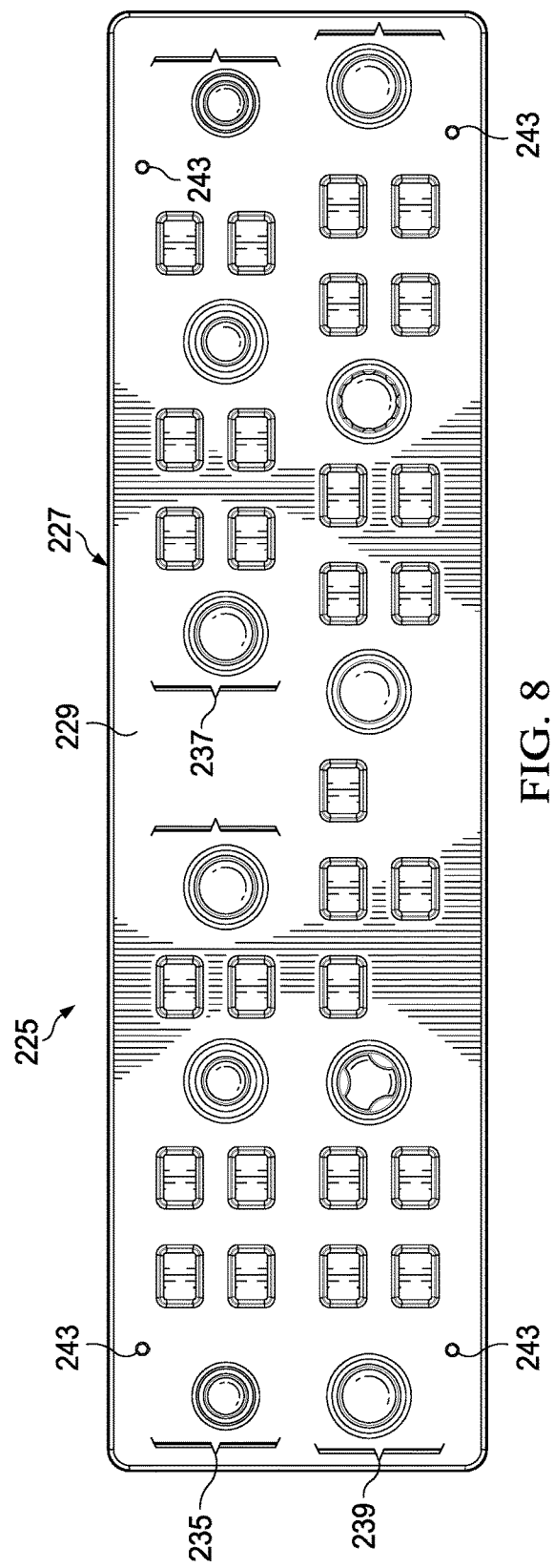
FIG. 8 is a front view of the combined controller of FIGS. 6 and 7.
Figure 11:
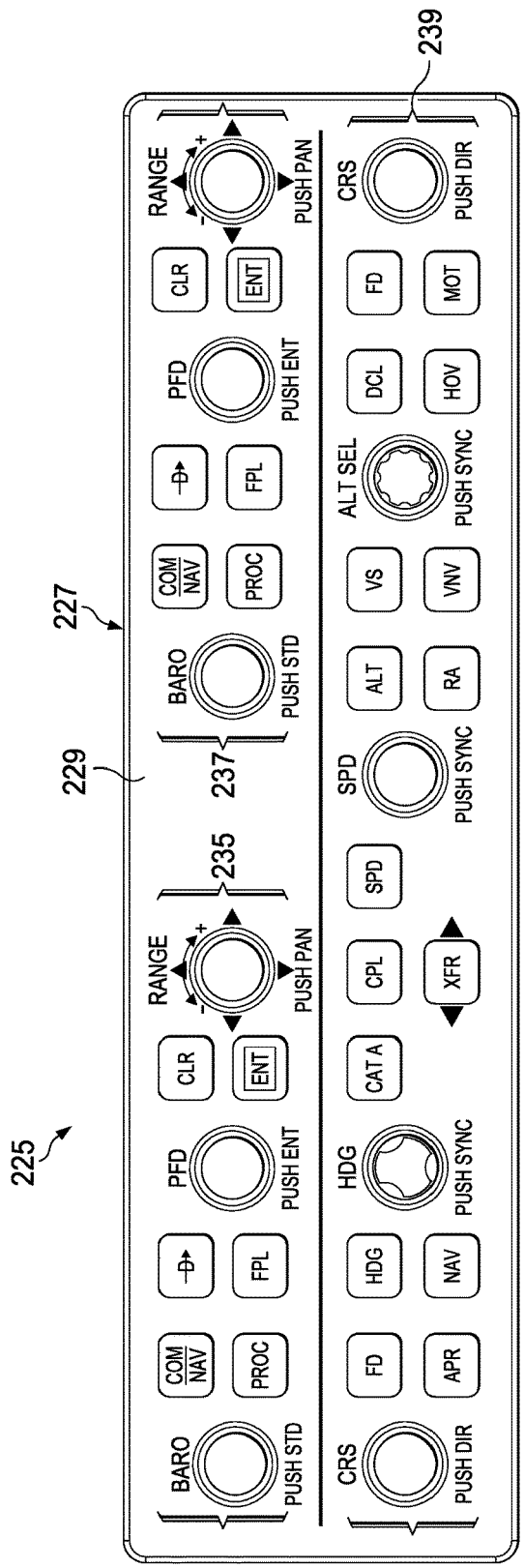
FIG. 11 is a front view of the combined controller of FIGS. 6-10.

Referring to FIG. 6, a cockpit 201 of a rotorcraft is illustrated. Cockpit 201 is similar to cockpit 101. As such, similar numbering will be used for similar components. Cockpit 201 includes a first primary flight display 203 and a second primary flight display 205 for the display of flight information to a first pilot and a second pilot, respectively. In between first primary flight display 203 and second primary flight display 205 are first multi-function display 211 and second multi-function display 213. Located on a center stack 219, between the pilots, is a first multi-function control unit 221. Adjacent to first multi-function control unit 221 is a second multi-function control unit 223. First and second multi-function control units 221, 223 are configured for the control of first and second multi-function displays 211, 213, respectively. Below first and second multi-function control units 221, 223 is a combined controller 225. Combined controller 225 is used to control first primary flight display 203, second primary flight display 205, and to control automated flight behavior.

As shown in FIGS. 7-11, combined controller 225 includes a panel 227 having a face 229 and an opposite back 231. Back 231 is configured to attach to a case 233. Case 233 is configured to house and protect the electronic components (not shown) of combined controller 225. On face 229 of panel 227 there are a plurality of first primary flight display inputs 235. Plurality of first primary flight display inputs 235 are configured to receive physical inputs from a pilot for the control of first primary flight display 203. Also on face 229 of panel 227 there are a plurality of second primary flight display inputs 237. Plurality of second primary flight display inputs 237 are configured to receive physical inputs from a pilot for the control of second primary flight display 205. Also on face 229 of panel 227 there are a plurality of flight control inputs 239. Plurality of flight control inputs 239 are configured to receive physical inputs from the pilots for the control of automated flight behavior. Combined controller 225 also includes four pawl latches 241 configured to engage center stack 219. Pawl latches 241 are engaged with a tool via openings 243 in face 229.

Figure 12:
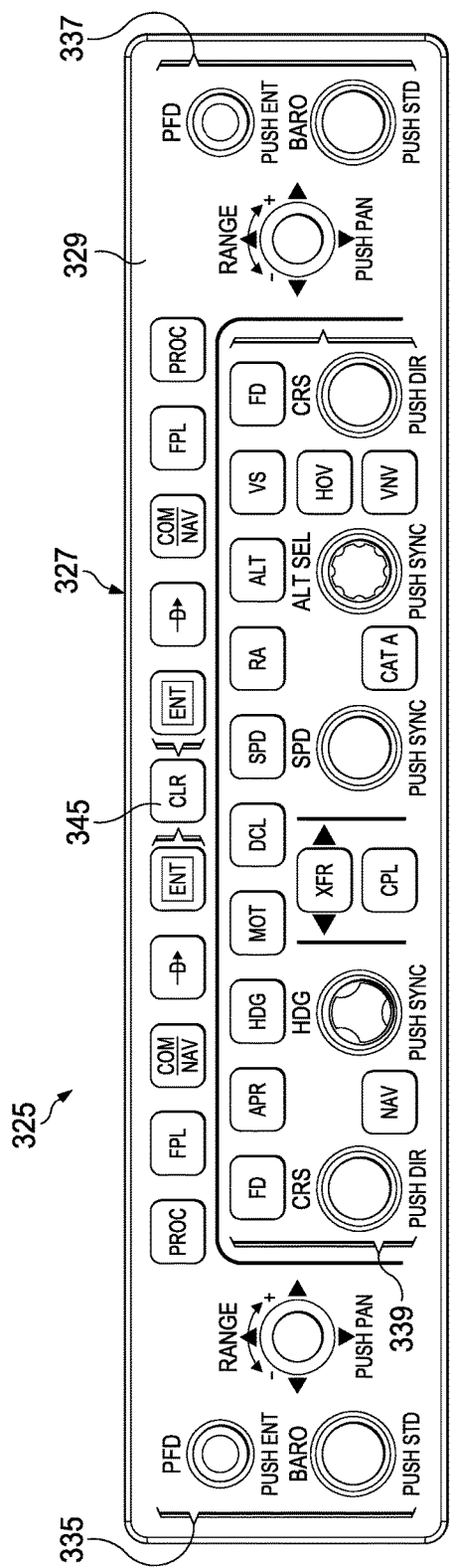
FIG. 12 is a front view of another embodiment of a combined controller according to this disclosure.

Referring to FIG. 12, another embodiment of a combined controller 325 is illustrated. Similar to combined controllers 125, 225, combined controller 325 includes a panel 327 with a face 329. Face 329 includes a plurality of first primary flight display inputs 335, a plurality of second primary flight display inputs 337, and a plurality of flight control inputs 339. However, unlike combined controllers 125, 225, combined controller 325 includes at least one shared input 345 that is shared between plurality of first primary flight display inputs 335 and plurality of second primary flight display inputs 337.

Figure 13:
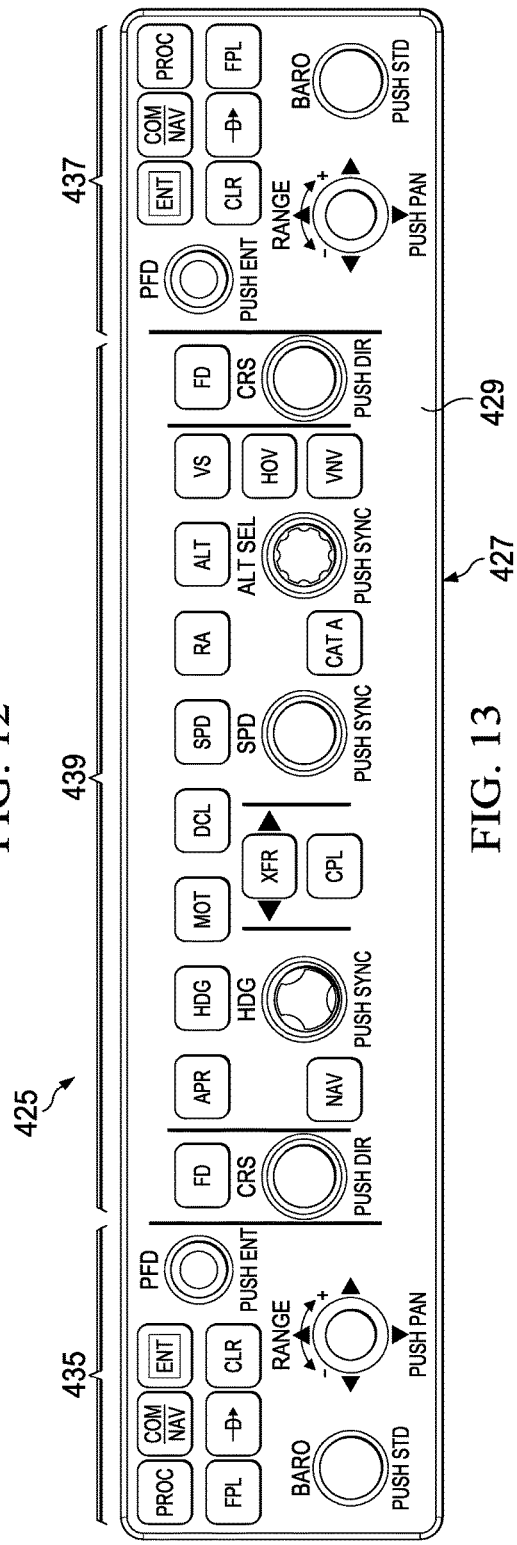
FIG. 13 is a front view of another embodiment of a combined controller according to this disclosure.

Referring to FIG. 13, another embodiment of a combined controller 425 is illustrated. Combined controller 425 includes a panel 427 with a face 429. Face 429 includes a plurality of first primary flight display inputs 435, a plurality of second primary flight display inputs 437, and a plurality of flight control inputs 439.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A control unit, comprising:
a panel having a face and an opposite back;
a case attached to the back of the panel;
a plurality of first primary flight display inputs on the face of the panel, the plurality of first primary flight display inputs being configured to receive physical inputs for the control of a first primary flight display;
a plurality of second primary flight display inputs on the face of the panel, the plurality of second primary flight display inputs being configured to receive physical inputs for the control of a second primary flight display; and
a plurality of flight control inputs on the face of the panel, the plurality of flight control inputs being configured to receive physical inputs for the control of automated flight behavior.

2. The control unit of claim 1, wherein at least one of each of the plurality of first primary flight display inputs, the plurality of second primary flight display inputs, and the plurality of flight control inputs comprise soft keys.

3. The control unit of claim 2, wherein at least one of each of the plurality of first primary flight display inputs, the plurality of second primary flight display inputs, and the plurality of flight control inputs comprise hard keys.

4. The control unit of claim 3, wherein at least one of the plurality of first primary flight display inputs is configured to control a first multi-function display.

5. The control unit of claim 4, wherein at least one of the plurality of second primary flight display inputs is configured to control a second multi-function display.

6. The control unit of claim 5, wherein the panel has a total area of less than fifty-three square inches.

7. An aircraft cockpit, comprising:
a first primary flight display;
a second primary flight display; and
a control unit, comprising:
a panel having a face and an opposite back;
a case attached to the back of the panel;
a plurality of first primary flight display inputs on the face of the panel, the plurality of first primary flight display inputs being configured to receive physical inputs for the control of the first primary flight display;
a plurality of second primary flight display inputs on the face of the panel, the plurality of second primary flight display inputs being configured to receive physical inputs for the control of the second primary flight display; and
a plurality of flight control inputs on the face of the panel, the plurality of flight control inputs being configured to receive physical inputs for the control of automated flight behavior.

8. The aircraft cockpit of claim 7, further comprising:
a first multi-function display;
a first multi-function control unit including a plurality of inputs configured to control the first multi-function display;
a second multi-function display; and
a second multi-function control unit including a plurality of inputs configured to control the second multi-function display.

9. The aircraft cockpit of claim 8, wherein at least one the plurality of first primary flight display inputs is configured to back-up the first multi-function control unit.

10. The aircraft cockpit of claim 9, wherein at least one the plurality of second primary flight display inputs is configured to back-up the second multi-function control unit.

11. The aircraft cockpit of claim 10, wherein at least one of the plurality of inputs on the first multi-function control unit is configured to back-up at least one of the plurality of first primary flight display inputs.

12. The aircraft cockpit of claim 11, wherein at least one of the plurality of inputs on the second multi-function control unit is configured to back-up at least one of the plurality of second primary flight display inputs.

13. The aircraft cockpit of claim 12, wherein at least one of the plurality of first primary flight display inputs, the plurality of second primary flight display inputs, and the plurality of flight control inputs comprises a soft key.

14. A rotorcraft, comprising:
a fuselage;
a rotor; and
a cockpit disposed within the fuselage, comprising:
a first primary flight display;
a second primary flight display; and
a control unit, comprising:
a panel having a face and an opposite back;
a case attached to the back of the panel;
a plurality of first primary flight display inputs on the face of the panel, the plurality of first primary flight display inputs being configured to receive physical inputs for the control of the first primary flight display;
a plurality of second primary flight display inputs on the face of the panel, the plurality of second primary flight display inputs being configured to receive physical inputs for the control of the second primary flight display; and
a plurality of flight control inputs on the face of the panel, the plurality of flight control inputs being configured to receive physical inputs for the control of automated flight behavior.

15. The rotorcraft of claim 14, the cockpit further comprising:
a first multi-function display;
a first multi-function control unit including a plurality of inputs configured to control the first multi-function display;
a second multi-function display; and
a second multi-function control unit including a plurality of inputs configured to control the second multi-function display.

16. The rotorcraft of claim 15, wherein at least one the plurality of first primary flight display inputs is configured to back-up the first multi-function control unit.

17. The rotorcraft of claim 16, wherein at least one the plurality of second primary flight display inputs is configured to back-up the second multi-function control unit.

18. The rotorcraft of claim 17, wherein at least one of the plurality of inputs on the first multi-function control unit is configured to back-up at least one of the plurality of first primary flight display inputs.

19. The rotorcraft of claim 18, wherein at least one of the plurality of inputs on the second multi-function control unit is configured to back-up at least one of the plurality of second primary flight display inputs.

20. The rotorcraft of claim 19, wherein at least one of the plurality of first primary flight display inputs, the plurality of second primary flight display inputs, and the plurality of flight control inputs comprises a soft key.

* * * * *